Patented Dec. 29, 1942

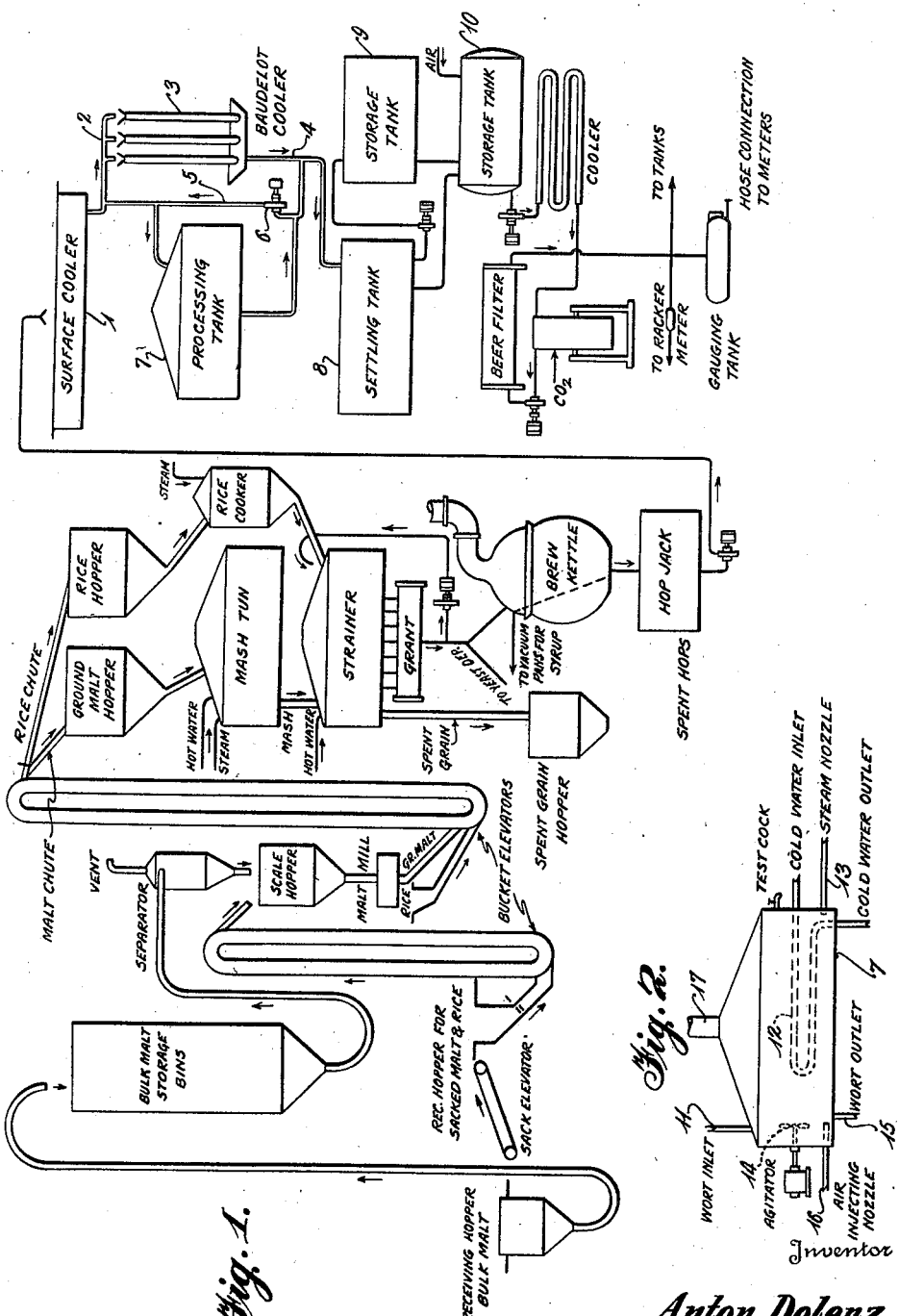

2,306,717

UNITED STATES PATENT OFFICE 2,306,717

FERMENTED MALT BEVERAGE

Anton Dolenz, San Francisco, Calif., assignor of one-half to Dorothy K. Dolenz, San Francisco, Calif.

Application March 24, 1941, Serial No. 384,963

9 Claims. (Cl. 99—48)

The present invention relates to a process of making a fermented malt or cereal beverage such as beer, ale, stout, porter, and the like, and is particularly adapted to the manufacture of lager beer.

The present invention contemplates manufacture of fermented malt beverages by an improved process which shortens the time of fermentation and aging, and produces an improved product at a materially reduced cost. In general, the present invention contemplates the employment of a high temperature fermentation step and an after treatment including a rapid heating to an elevated temperature. Contrary to the expectations of the art it has been found that a highly satisfactory beverage can be produced in a much shorter period of time by fermentation at an elevated temperature such as 20–24° R. Furthermore, it has been found that the green beer constituents of a fresh beer can be eliminated by a rapid heating of the beer to an elevated temperature. It has likewise been found that yeast cells may be disrupted by high temperature treatment and by vigorous agitation, liberating the protoplasm and vitamins into the beverage; these materials enrich the beverage nutritionally and aid in the clarification thereof.

Therefore, it is an object of the present invention to provide an improved process for making fermented malt beverages.

It is another object of the present invention to provide a process for making fermented malt beverages in which the fermentation time is substantially reduced below that employed in conventional processes.

A further object of the invention is to provide an improved brewing process in which the time required for aging has been materially shortened.

A still further object of the invention is to provide an improved brewing process which increases the nutritional value of the beverage and at the same time facilitates clarification.

Another object of the invention is to provide a brewing process which permits a material reduction in the amount of equipment required as well as a material reduction in the length of time said equipment is used.

These and other objects of the invention will be apparent to those skilled in the art from the following description and its relation to the conventional brewing process.

In conventional processes a fermentable solution of sugars, called a "wort," is prepared by converting the starch in various cereals to sugars by means of malt or other enzymes. The wort is then flavored by boiling with hops, following which it is cooled to around 7 to 9° R. Yeast is then added and the wort allowed to ferment at this temperature for a period of from 9 to 12 days. Following fermentation the fermented beer is run into storage tanks where it is allowed to settle and clarify for a period of from several weeks to several months, during which time aging also takes place. The beer is then ready for carbonation either mechanically or by krausening, and is then ready for filtering and packaging.

The present invention may employ conventional methods for preparing the wort. This portion of the process forms no part of the present invention and may be varied as desired. According to the present invention after the wort has been boiled with hops, it is cooled, for example, to a fermentation temperature of from 20–24° R., which is considerably higher than conventional fermenting temperatures. Temperatures in excess of about 24° R. are ordinarily not preferred since it has been found that at materially higher temperatures the activity of the yeast actually decreased, thus defeating the purpose of the high temperature. Temperatures of about 20° R. increase the fermentation time from 4–8 hours above the time required at 24° R. Lower temperatures, such as 15° R. may be employed but the time required, about twice the time required at 24° R., makes such temperatures less desirable. The optimum temperature for particular conditions, such as, type, nature, and condition of yeast, type of wort, and the like, can readily be determined by the individual operator.

When at the desired temperature, the wort is pitched with yeast, which may be in conventional quantities, such as 1–1½ pounds per barrel of wort, and fermentation is conducted for a period of from 12 to 40 hours, usually about 36 hours, depending upon the wort, yeast and temperature employed, the product desired and the like. The fermented beer containing the yeast may then be rapidly heated to an elevated temperature, such as 48 to 60° R. to eliminate undesirable green beer constituents and to disrupt the yeast cells.

Lower temperatures such as 40° R. may be used but are usually not desired because they are usually less effective in eliminating undesirable green beer constituents, in stopping the action of the yeast, and in disrupting the cells. Temperatures of about 48–60° R. are preferred since they are more effective for the purposes mentioned and also effect a pasteurization. Higher temperatures than 60° R. may also be employed but are usually to be avoided as they tend to give the beverage a cooked taste unless the heating and cooling are sufficiently rapid to avoid that difficulty. About 60° R. has been found to produce the best results in general.

The heating is preferably accomplished as rapidly as possible, usually in from one-half to two hours. The rise in temperature should be rapid so as to avoid the possibility of undesirable fermentations which might result at some elevated temperatures favorable to undesirable organisms. Likewise, the period at which the beverage is held at the elevated temperature is as short as consistent with good practice to avoid any undesirable effect on the taste. In general, the temperatures and time periods specified have been found highly satisfactory. Other temperatures and times outside the preferred range may be employed but usually with less satisfactory results. The temperature and time periods will vary with local operating conditions. In general, the higher the temperature the shorter the time period, and vice versa. The desired conditions can readily be determined by the individual operator. Almost any rapid method of heating may be employed. Indirect heating involving the transfer of heat through a wall of the vessel, such as by means of steam coils, direct firing and the like may be employed. However, direct heating by means of live steam is to be preferred, since it aids materially in disrupting the yeast cells. The minute vibrations produced by the direct contact of the steam with the beverage break the cell wall and allow the protoplasm of the yeast to become part of the beverage. It has been found that steam at 100–150 pounds pressure, ordinarily available at breweries, may be used to satisfaction. Too low a steam pressure prevents the gases from reaching a velocity sufficient to effect a rapid removal of fermentation odors. Too high a steam pressure may cause excessive foaming, requiring the operation to be conducted in a vessel of larger volume.

The rapid heating causes the carbon dioxide and other gases dissolved in the beer to be rapidly evolved. This rapid evolution of gas carries with it the undesirable green beer constituents responsible for the green taste of the unaged beverage. The evolution of gas and undesirable constituents is facilitated by means of the live steam which effects a sort of steam distillation. The heating step should preferably be conducted in a vessel permitting free communication to the atmosphere in order to allow the free escape of the undesirable gases.

When direct steam heating is employed it will be apparent that some dilution of the beverage will result. Accordingly, it is preferred to start with a wort of higher balling so that when the beer is diluted by means of the condensed steam it may be at the desired gravity. It will be apparent that when indirect heating is employed there is no necessity for starting with a higher gravity wort than conventionally employed.

The steam employed for heating may be the regular steam available at the brewery. Many plants employ direct steam heating in the mash tun or in the brew kettle. Ordinarily precautions employed to insure purity of steam will suffice for the present invention.

During the heating large quantities of yeast cells are disrupted, releasing their contents into the beer. This is desirable for a number of reasons. The soluble proteins present within the yeast cell are thus incorporated within the beverage and increase its nutritional value. The soluble proteins also increase the foaming properties. The vitamins, particularly vitamins B1, B2 and D, contained in the yeast are likewise incorporated in the beverage. Furthermore, the disrupted cell walls of the yeast together with any coagulated proteins act as a floc which, when the beer is allowed to settle, carries down large quantities of colloidal solids suspended in the beer, thus accelerating clarification.

The disruption of the yeast cells may be facilitated by means of an agitator, although this is not absolutely necessary. It is preferred to employ a screw propeller type of agitator having ragged or saw tooth edges. This agitator may be rotated at high speed, for example, 1800 R. P. M. and, particularly when the saw tooth propeller is employed, materially aids in disrupting the cells. The agitation is usually employed during the heating step and may be employed during the entire period of heating. However, a shorter period of time, as for example, one-half hour, gives quite satisfactory results. The length of the agitating period depends largely on the conditions obtaining and the results desired. For example, when live steam is employed for heating, agitation may be dispensed with more readily than when other types of heating are used. This is due to the agitation and vibration produced by the live steam. With less violent means for heating, increased agitation may be employed with advantage. It will be readily apparent that the best results are obtained by the combination of vigorous heating and agitation.

After the heating has been carried on to the extent desired, it is preferred to rapidly cool the beer to minimize the possibility of the beer acquiring a cooked or pasteurized taste. The cooling may be continued until the beer reaches a temperature of ½ to 2° R. or to any desired temperature. Any conventional type of cooler may be employed, the Baudelot cooler conventional in brewing serving satisfactorily. The cooled beer is then run into storage tanks where it may be allowed to settle.

In approximately 48 hours most of the suspended solids have settled to the bottom of the storage tank and the beer can now be withdrawn, carbonated and packaged. It has been found that the clarification step is materially facilitated by the present invention for the reason stated hereinbefore. The clarified beer withdrawn from the storage tank can be packaged directly without any further clarification if desired.

However, it may be very readily filtered through conventional filters to remove any final traces of suspended solids, if desired. This filtration step is very simple since there are only minute quantities of solids remaining after settling.

The steps of rapidly heating and of disrupting the yeast cells are not limited to the treatment of a beverage prepared by my high temperature fermentation process but may also be applied to the treatment of beverages fermented according to conventional processes, since those steps are also effective in rapidly maturing such conventionally fermented beverages. However, the high temperature fermentation and the rapid heating are preferably carried out in conjunction with each other. The combination of the two steps is particularly effective for the present purposes. The time saved in fermentation augments considerably the time saved in aging. Also the fermented beer is already at an elevated temperature and requires less heating to attain the final desired temperature. Furthermore, the rapid heating is effective in instantaneously stopping the activity of the yeast at any desired point. For these reasons it will be apparent that it is preferred to employ the combination of rapid fermentation and rapid aging.

The present invention is preferably employed in conjunction with conventional brewing processes. For example, about 30% of the production of a particular plant may be according to the prior art processes for the purpose of yielding sufficient excess carbon dioxide and yeast to make up for the quantities required in the process of the present invention, since by the present invention the yeast and carbon dioxide are not recovered. The products of the two processes may be blended together if desired or may be packaged and disposed of separately. However, it is not necessary to conduct the present process in conjunction with conventional processes. Yeast and carbon dioxide can be readily purchased at low cost. Furthermore, the carbon dioxide evolved during fermentation may be collected, purified if desired, and used to carbonate the beer.

In the drawing, Fig. 1 is a flow sheet of an embodiment of the present invention. The process up to the beginning of fermentation is conventional and no detailed description thereof is deemed necessary. After the wort is withdrawn from the hop jack, it is pumped into a surface cooler 1 in which the beer is partially cooled and clarified. From the surface cooler the wort is withdrawn by means of pipe 2 and run through the Baudelot cooler 3 in which its temperature is reduced, preferably to approximately 20 to 24° R. The beer is withdrawn from the bottom of the cooler by means of pump 6 and forced into the processing tank 7, the details of which are shown in Fig. 2. The wort may be fermented in the processing tank, following which it may be heated and agitated within the same tank to liberate green beer constituents and disrupt the yeast cells as described hereinbefore. Following heating and agitation the beer may be cooled either within the processing tank or otherwise. After cooling it may be run into the settling tank 8 for clarification. The clarified beer may be withdrawn to storage tank 9 or may be conducted into tank 10 and from there through the usual cooling, carbonating, filtering and like operations conventional in the art.

In Fig. 2 I have shown one form of processing tank which has proved highly satisfactory. It is composed of a tank 7 of any suitable shape and is provided with a wort inlet 11, a cooling coil 12, a steam nozzle 13, an agitator 14, a wort outlet 15, an air injecting nozzle 16 and a vapor outlet 17. In use, the wort preferably at the desired fermentation temperature is run into the processing tank, wherein it is pitched with yeast and then aerated for approximately ten minutes by means of air injected through the air injecting nozzle. This step is conventional in brewing operations and may be omitted if desired. The beer is maintained at fermentation temperatures for a desired period following which steam may be injected through the steam nozzle and the wort may be agitated by means of the agitator 14, which preferably has a ragged or saw-tooth edge. The steam nozzle is preferably a direct steam jet in the form of an ejector. The rapid passage of the steam through the ejector draws beer into the inlet of the nozzle, and the mixture of steam and beer is discharged into the body of the beer within the tank. Thus, steam is brought into more intimate contact with the beer, accomplishing more uniform and rapid heating. Rapid movement of the steam likewise produces a rather violent agitation and maintains the temperature of the wort more or less uniform throughout the tank. Furthermore, the uniform intimate contact of the beer with the steam eliminates the excess noise and vibration known as "bumping" ordinarily produced by direct steam heating. At the completion of the heating and agitation operations the beer may be cooled within the processing tank by means of the cooling coil 12 or the beer may be withdrawn from the processing tank and cooled elsewhere.

It will be apparent that the form of the processing tank may vary quite widely. It may be provided with a steam coil, steam jacket, or may be arranged to be heated electrically or by direct firing. The direct steam heating previously described is preferred for the reasons stated hereinbefore. However, the same is not necessary and the other forms of heating mentioned may be provided, but usually with less satisfactory results.

It is also evident that the manner in which the processing tank is used may be varied widely. For example, the beer may be fermented in ordinary fermentation tanks and then be run into the processing tank for the heating and agitation steps or the cooling following heating and agitation may be done outside the processing tank. The number of operations to be carried on within the processing tank depends upon the number of such tanks available as well as the time which the various operations require. To carry on all operations such as cooling, fermenting, heating and agitation, final cooling and settling within the process tank would usually tie up that tank for too long a period. For this reason it is preferred to conduct only the fermentation and the heating and agitating within the processing tank.

It will be apparent that the present invention has numerous advantages over the prior art. It produces a perfectly matured beverage in two weeks or less as compared to several months required by the prior art. In addition the product is enriched with the protoplasm and vitamins of the yeast. The process also obviates the necessity for large storage space, requiring only about one-quarter of the space necessary in a conventional brewing process. The cost of refrigeration is likewise considerably less since there is no need for maintaining large quantities of beer in storage at low temperatures. In general, the present invention in addition to producing an improved product, reduces the time, the investment in plants with the corresponding reduction in taxes, insurance, etc. Furthermore, since the beer is not maintained in storage for such a long period of time the possibility of infection is materially reduced.

This application is a continuation in part of my copending application Serial No. 271,457, filed May 3, 1939.

While various embodiments of the invention have been described in detail, it is to be understood that the invention is not limited thereto, but may be varied within the range of the following claims:

I claim:

1. In a process for making a fermented malt beverage, the steps of: fermenting a yeast-containing wort at a temperature of about 20 to 24° R to produce rapid fermentation thereof in about 12 to 40 hours; and then quickly heating the fermented wort to a temperature of about 60° R in about ½ to 2 hours to effect the release of undesirable green beer constituents and fermentation gases therefrom.

2. In a process for making a fermented malt beverage, the steps of: fermenting a yeast-containing wort at a temperature of about 20 to 24° R to produce rapid fermentation thereof in about 12 to 40 hours; agitating the fermented wort sufficiently to rupture a substantial portion of the yeast cells in said fermented wort and release the protoplasm thereof into said fermented wort; and quickly heating the fermented wort to a temperature of about 60° R in about ½ to 2 hours to effect the release of undesirable green beer constituents and fermentation gases therefrom.

3. In a process for making a fermented malt beverage, the steps of: fermenting a yeast-containing wort at a temperature of about 20 to 24° R to produce rapid fermentation thereof in about 12 to 40 hours; agitating the fermented wort sufficiently to rupture a substantial portion of the yeast cells in said fermented wort to release the protoplasm thereof into said fermented wort and, simultaneous with said agitation, quickly heating the fermented wort to a temperature of about 60° R in about ½ to 2 hours to effect pasteurization and release of undesirable green beer constituents and fermentation gases therefrom; and then quickly cooling the pasteurized gas-free wort to slightly above freezing.

4. The process of making lager beer which comprises fermenting a yeast-containing wort at a temperature within the approximate range of from 20–24° R. for a period of from 12–40 hours; thereafter rapidly heating the fermented wort to approximately 48–60° R. in about ½–2 hours to effect the release of undesirable green beer constituents and fermentation gases, and rapidly cooling the fermented wort.

5. The process of making lager beer which comprises fermenting a yeast-containing wort at from 20–24° R. for a period of from 24–36 hours, thereafter rapidly heating the fermented wort to about 60° R. in a period of from ½–2 hours by means of live steam, whereby to effect the release of undesirable green beer constituents and fermentation gases, and rapidly cooling the fermented wort.

6. In a process for making a fermented malt beverage, the step of: rapidly heating a fermented yeast-containing wort to a temperature of about 48° to 60° R. in about ½ to 2 hours, whereby to effect the release of undesirable green beer constituents and fermentation gases from said wort.

7. In a process for making a fermented malt beverage, the steps of: rapidly heating a fermented yeast-containing wort to a temperature of about 48° to 60° R. in about ½ to 2 hours, whereby to effect the release of undesirable green beer constituents and fermentation gases from said wort; and vigorously agitating said wort during at least a portion of the heating period to disrupt the yeast cells and thereby liberate the protoplasm and vitamins thereof into said wort.

8. A process for making a fermented malt beverage comprising the steps of: fermenting a yeast-containing wort at a temperature of about 24° R. in about 36 hours, heating the fermented wort to a temperature of about 60° R. in about 2 hours, to effect the release of undesirable green beer constituents and fermentation gases from said fermented wort, and then rapidly cooling the heated, gas-free wort to a temperature slightly above freezing.

9. A process for making a fermented malt beverage comprising the steps of: fermenting a yeast-containing wort at a temperature of about 20° to 24° R. in about 12 to 40 hours, heating the fermented wort by live steam at a pressure of about 100 to 150 pounds to vigorously agitate and disrupt the yeast cells to liberate the protoplasm and vitamins into the wort and rapidly raise the temperature of said wort to about 48° to 60° R. in about ½ to 2 hours to effect the release of undesirable green beer constituents and fermentation gases from said fermented wort, mechanically agitating said wort to further disrupt the yeast cells during at least a portion of said heating period, and then rapidly cooling the heated, gas-free wort in as short a time as possible to a temperature of about ½° to 2° R.

ANTON DOLENZ.